3,317,475
COPOLYMERIZATION OF GASIFORM FORMALDEHYDE
George Walter Halek, New Providence, Frank Michael Berardinelli, South Orange, Charles Malcolm Hendry, Berkeley Heights, and William John Roberts, Bernardsville, N.J., assignors to Celanese Corporation, a corporation of Delaware
Filed June 24, 1963, Ser. No. 289,837
11 Claims. (Cl. 260—67)

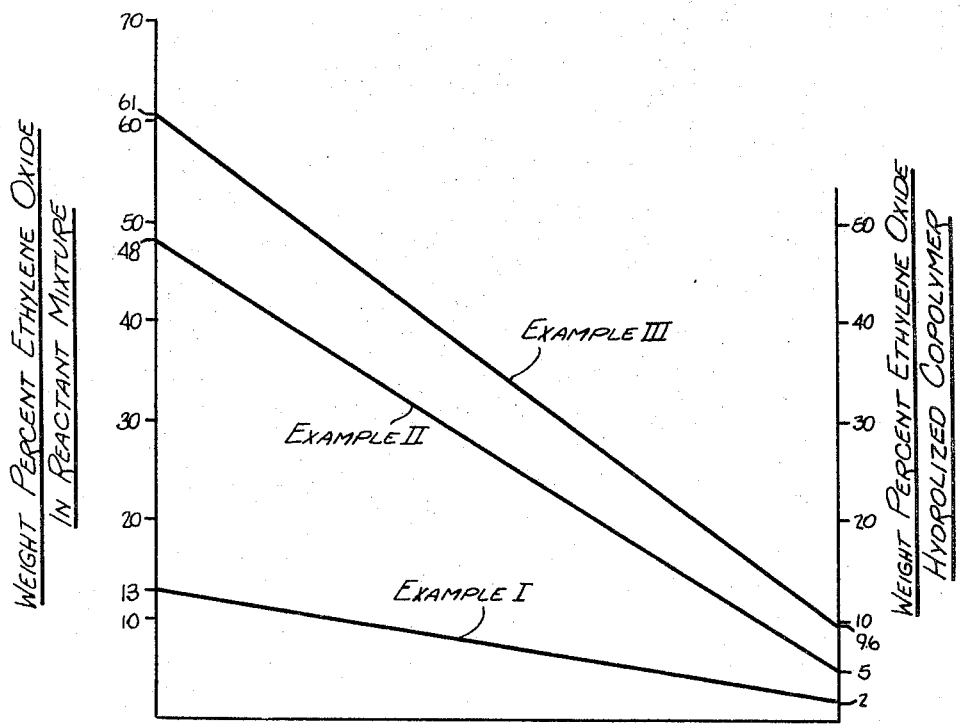

This invention relates to the copolymerization of formaldehyde to produce stable polymers having successively recurring oxymethylene groups interspersed with divalent comonomeric groups having adjacent carbon atoms.

It is known that oxymethylene polymers having successively recurring oxymethylene units are useful in the production of molded and extruded objects. Such polymers have excellent physical properties and produce strong molded objects. It is known that the thermal stability of oxymethylene polymers may be enhanced by the incorporation into the polymer molecule of interspersed comonomeric units having adjacent carbon atoms. It is desirable to incorporate such comonomeric units in controlled amounts since excessive proportions of interspersed comonomeric units impair the physical properties of the polymers while insufficient amounts of the comonomeric units fail to provide the required thermal stability.

The amount of comonomer to be incorporated into an oxymethylene polymer for optimum enhancement of thermal stability without impairment of physical properties will vary depending upon the particular comonomer used and depending upon the properties desired in the copolymer. For copolymers having oxymethylene groups interspersed with groups derived from a cyclic ether, such as the copolymers described in U.S. Patent No. 3,027,352 of Walling, Brown and Bartz the proportion of comonomer units generally varies from about 0.1 to about 15 percent of the total monomeric units. The preferred copolymers contain from about 0.1 to about 5 percent of comonomer units.

Other classes of comonomers include compounds with ethylenic unsaturation such as isobutylene, styrene, vinyl ethers, vinyl acetate, vinyl methyl ketone, acrolein and diethylenically unsaturated compounds such as butadiene. Other classes of comonomers include vinyl nitrogen compounds such as N-vinyl amines and N-vinyl amides such as N-vinyl-alpha-pyrrolidone, N-vinyl-para-tolyl-N-vinyl-carbazole, N-vinylalkylformamides, N-vinyl, N-cyclohexylacetamide, N-vinylsuccinamide, N-vinylphthalamide, N-vinylpiperidine, N-vinyl-beta-propionolactam, etc.

In above-mentioned U.S. Patent 3,027,352 stable copolymers having successively recurring oxymethylene groups are prepared by copolymerizing trioxane with a cylic ether. In accordance with the present invention stable copolymers are prepared by copolymerizing formaldehyde with a cyclic ether of high vapor pressure or with other oxycyclic comonomers of high vapor pressure having adjacent carbon atoms, as explained more fully hereinbelow.

The copolymerization of formaldehyde with comonomers having adjacent carton atoms presents problems which the copolymerization of trioxane does not present. It has been found that while it is relatively easy to produce copolymers of formaldehyde having relatively high proportions of comonomeric units incorporated therein, it is exceedingly difficult to prepare copolymers having the low desired proportions of comonomeric units which provide stability while at the same time do not impair the physical properties of the homopolymer.

It has been proposed to copolymerize formaldehyde with other monomers in a liquid medium wherein formaldehyde and the desired comonomers are continuously introduced in admixture. In such polymerization systems it has been found that when the admixture contains a relatively high proportion of comonomer the copolymerization proceeds satisfactorily but produces a copolymer containing an excessive amount of comonomeric units for optimum physical properties. On the other hand, when the admixture contains a relatively low proportion of comonomer the polymerization process produces formaldehyde homopolymer while the comonomer either remains unreacted or reacts only with itself to produce a second homopolymer in admixture with the formaldehyde homopolymer.

In accordance with one aspect of the present invention there is provided a method of producing a stable polymer having successively recurring oxymethylene groups interspersed with divalent comonomeric groups having adjacent carbon atoms which comprises passing a gasiform mixture of formaldehyde and a comonomer into a reaction zone (which, in a preferred embodiment, may be liquid-free) in the presence of a cationic catalyst, said comonomer having adjacent carbon atoms and being capable of copolymerization with formaldehyde in the presence of said cationic catalyst and said mixture containing from about 0.01 to about 10 mols of comonomer per mol of formaldehyde and reacting said mixture in said reaction zone to produce a polymer of high molecular weight (about 1000, preferably between 5000 and $10^6$) in contact with said gasiform mixture.

The nature of the comonomer per se does not constitute a portion of this invention. Any material, preferably oxacyclic which is known to be copolymerizable with formaldehyde in cationic polymerization, which contains adjacent carbon atoms and which has a vapor pressure at the reaction temperature sufficiently high to avoid the formation of a liquid phase in the reaction zone may be used in accordance with this invention.

In a particularly preferred embodiment of our invention the polymeric compounds to be created are oxymethylene copolymers having at least one chain containing recurring oxymethylene units interspersed with —OR— groups in the main polymer chain, where R is a divalent radical containing at least two carbon atoms directly linked to each other and positioned in the polymer chain between the two valences, with any substituents on said R radical being inert, that is those which are free of interfering functional groups and will not induce undesirable reactions. Particularly preferred are copolymers which contain from 85 to 99.6 mole percent of recurring oxymethylene groups. In a preferred embodiment R may be, for example, an alkylene or substituted alkylene group containing at least two carbon atoms.

Among the copolymers which may be made in accordance with this invention are those having a structure comprising recurring units having the formula

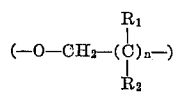

wherein $n$ is an integer from zero to 5 and wherein $n$ is zero in from 60 to 99.6 percent of the recurring units. $R_1$ and $R_2$ are inert substituents, that is, substituents which are free of interfering functional groups and will not induce undesirable reactions.

A preferred class of copolymers are those having a structure comprising oxymethylene and oxyethylene recurring units wherein from 85 to 99.6 percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing trioxane with a cyclic ether having the structure

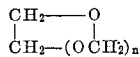

where $n$ is an integer from zero to 2.

Suitable cyclic ethers include ethylene oxide; 1,3 dioxolane; 1,4 dioxane; trimethylene oxide, tetramethylene oxide, pentamethylene oxide; 1,2 propylene oxide; 1,2 butylene oxide; 1,3 butylene oxide; 2,2 di(chloromethyl)1,3 proplene oxide, etc.

When the comonomer is a normally gaseous material or a material which vaporized completely at the temperature of the reaction, it is simply passed into the reaction zone in the state in which it exists at the reaction temperature, namely the gasiform state.

On the other hand, when the comonomer is a liquid of relatively high vapor pressure but having a boiling point above the reaction temperature, it is passed into the reaction zone at a reduced partial pressure so that its gasiform state may be maintained. It is preferably passed into the reaction zone in admixture with an inert gas, such as nitrogen, the admixture being prepared by bubbling nitrogen through the volatile liquid comonomer.

As used in the specification and claims of the subject application, the term "oxymethylene" includes substituted oxymethylene, where the substituents are inert with respect to the reaction in question, that is, the substituents are free of interfering functional groups and will not induce undesirable reactions.

The cationic catalysts which may be used in accordance with this invention include strongly acidic materials and particularly acidic metal halides which have vapor pressures sufficiently high so that the desired catalyst concentration may be maintained in gasiform state in the reaction zone.

The preferred catalysts are boron trifluoride and its volatile organic complexes. Gaseous boron trifluoride, itself is preferred. When volatile complexes such as boron trifluoride diethyl etherate are used, they are preferably volatilized by an inert gas, such as nitrogen. For convenience in metering the catalyst into the reaction zone, even a gaseous catalyst, such as boron trifluoride, may be blended with an inert gas, such as nitrogen. The nature of the polymerization catalyst per se does not constitute a portion of this invention.

The proportion of catalyst used in the polymerization may vary considerably depending upon the nature of the catalyst, the temperature of the reaction and the nature of the comonomer. Generally, between about 0.01 and about 2 wt. percent of the catalyst based upon total monomers is suitable. For ethylene oxide and gaseous boron trifluoride catalyst the preferred proportions are between about 0.01 and about 1 wt. percent based on the total weight of monomer.

The temperature of the reaction may vary from a minimum of about −19° C. to a maximum of about 100° C. In the copolymerization of formaldehyde with ethylene oxide, the preferred temperature is from about 10° C. to about 60° C.

The mol ratio of comonomer to formaldehyde may vary depending upon the nature of the comonomer. For ethylene oxide it is preferred that the mol ratio of comonomer to formaldehyde be between about 1 to 0.1 and about 1 to 2.

It has been found that copolymers made in accordance with the method of this invention have not only higher thermal stability than homopolymers, but also substantially higher stability against alkaline hydrolysis. Stability against alkaline hydrolysis is a useful measure of the degree of dispersion of the comonomer units in the polymer chain. It has been found that when comonomer units are dispersed throughout the polymer chain the polymer is stable against alkaline hydrolysis. It is believed that under alkaline hydrolysis conditions oxymethylene units at the ends of the copolymer chain degrade until a comonomer unit with adjacent carbon atoms is reached and becomes the terminal unit of the chain. Comonomer units having adjacent carbon atoms are stable to further degradation under alkaline hydrolysis conditions and terminate the degradation process at the end of the polymer chain when such units become terminal units. Distribution of the comonomer units throughout the polymer chain assures the reaching of a stable comonomer unit before substantially complete degradation of the chain takes place.

Stability to alkaline hydrolysis is determined by measuring the weight loss of polymer when treated in a 10% solution of polymer in a solvent having equal weights of dimethyl formamide and benzyl alcohol and containing 1 part tributyl amine per 100 parts of polymer at a temperature of 160° C. for a period of 1 hour.

Generally, the gasiform monomers are fed into the reaction zone and, after reaction, unreacted monomers may be passed into subsequent reaction zones, if desired, or may be recycled to the reaction zone.

Upon completion of the polymerization reaction and passage of the monomer vapors out of the reaction zone or the last of a series of reaction zones, the reaction in the effluent gas is terminated, preferably by the addition of a stoichiometric excess of an alkaline material such as tributylamine to neutralize the cationic catalyst and prevent the formation of polymer in the transfer lines.

The polymer produced collects on the sides and primarily on the bottom of the reaction vessel. It is recovered by scraping from the reactor and any catalyst therein is neutralized by treating the polymer with tributylamine in acetone solution. The polymer is then subjected to a non-acidic hydrolysis step to degrade the unstable portion of the polymer and leave a stable residue as disclosed in U.S. patent application Ser. No. 102,097, filed Apr. 11, 1961, now abandoned, by Frank M. Berardinelli. The hydrolysis step may be carried out in an aqueous ammonia solution containing between about 0.01 and 1.0 wt. percent of ammonia at a temperature between about 130° C. and about 180° C. for a period between about 30 and about 300 seconds.

Alternatively, the polymer may be hydrolyzed in a non-aqueous system by refluxing in a mixture of dimethyl formamide and benzyl alcohol containing a small amount of tributylamine.

The residue from the polymer hydrolysis is generally blended with stabilizers against thermal degradation. The proportion of stabilizers incorporated depends upon the specific stabilizer or stabilizers used. A proportion between about 0.05 and 10 weight percent (based on the weight of polymer) has been found to be suitable for most stabilizers.

One suitable stabilizer system is a combination of (1) an anti-oxidant ingredient, such as phenolic anti-oxidant, and preferably a substituted bisphenol, and (2) an ingredient to inhibit chain scission, generally a compound of a polymer containing trivalent nitrogen atoms.

A suitable class of substituted bisphenols are the alkylene bisphenols including compounds having from 1 to 4 carbon atoms in the alkylene group and having from zero to 2 alkyl substituents on each benzene ring, each alkyl substituent having from 1 to 4 carbon atoms. The prefererd alkylene bisphenols are 2,2′-methylene bis-(4-methyl-6-tertiary butyl phenol) and 4,4′-butylidene bis-(6-tertiary butyl-3-methyl phenol). Suitable phenolic stabilizers other than alkylene bisphenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrolidone, hydrazides, compounds having 1 to 6 amide groups, proteins, compounds having tertiary amine and terminal amide groups, compounds having amidine groups, cycloaliphatic amine compounds and aliphatic acylureas. The stabilizers may be present in the melt hydrolysis step or they may be added to the hydrolyzed polymer after the melt hydrolysis step.

Copolymers prepared in accordance with this invention generally have $K_{D230}$ values, after hydrolysis and after the addition of stabilizers, which are not higher than about 0.1 wt. percent per minute. The $K_{D230}$ value is a measure of the rate of degradation of the polymer when maintained at a constant temperature of 230° C. The values are determined by weighing the polymer periodically while it is maintained in an oven heated to 230° C. in circulating air and determining successive weight differences in the polymer. $K_{D230}$ values are measured as weight percent degradation per minute.

Copolymers prepared in accordance with this invention generally have well distributed comonomer groups, as evidenced by analysis of the hydrolysis products. When ethylene oxide is the comonomer, hydrolysis residues show that at least 30% of the ethylene oxide is incorporated as single units, rather than as segments of two or more successive units.

EXAMPLES.—GENERAL PROCEDURE

In all of the following examples the reaction was carried out in a gas flow system that consisted of metering formaldehyde gas and ethylene oxide gas into an 18″ long one-inch diameter glass mixing tube that discharged the mixture into the lower portion of a 1500 ml. glass resin flask. The formaldehyde was generated at a rate of 400 ml./minute by pyrolyzing alpha-polyoxymethylene and led through a cold trap at −15° C. and then through a cyclohexane scrubber into the mixing tube. The ethylene oxide was commercial ethylene oxide, fed from a tank through a flowmeter and two gas safety traps into the mixing tube. $BF_3$ gas was fed from a 500 ml. flask by displacement by mercury into a second mixing tube where a stream of nitrogen gas swept it into the lower portion of the reaction vessel. The $BF_3$-nitrogen gas stream contained about 1 wt. percent $BF_3$. The exhaust gases proceeded up the flask into a 3 foot x ¾ inch stack and then out into the atmosphere. The total residence volume was 1600 ml.

The whole system was scrupulously cleaned and was baked dry at 120° C. for several hours before assembly. Precautions were taken at all times to exclude moisture from the system. A trickle flow of dry nitrogen was used before the run to insure a dry reaction system.

The run procedure consisted of purging the system with dry nitrogen and then filling the reactor with the mixture of formaldehyde and ethylene oxide. The $BF_3$ was then started and there immediately ensued white vapors resembling tobacco smoke in the reaction zone indicating the formation of polymer in a disperse phase. The reactor quickly filled with these clouds and soon the walls were coated with a film of solids while a snowy-cloudy vapor was continuously observed in the gas-space. Polymer collected on all of the glass surfaces but primarily on the bottom of the reactor as a fine powder.

The product was scraped from the reactor into acetone containing tributylamine to deactivate the catalyst. It was washed several times with acetone and dried at 60° C. in a vacuum oven. It was then hydrolyzed by refluxing a mixture of 1 part of polymer in 10 volumes of a mixture of 5 volumes of dimethyl formamide and 5 volumes of benzyl alcohol and 0.01 part of tributylamine for 1 hour followed by cooling, filtering, washing three times in acetone and drying to constant weight at 60° C.

*Example I*

A mixture of formaldehyde gas, ethylene oxide gas and $BF_3$ in nitrogen gas was passed through the reaction system described in the general procedure for one hour at 25° C. Total throughput was 26 g. of formaldehyde, 3.8 g. of ethylene oxide and 0.03 g. $BF_3$. There resulted 3.4 g. of product after washing and drying. The product retained 48% of its weight during the solution hydrolysis. It then had an I.V. (inherent viscosity) (0.1 g./100 ml. of 98/2 p-chlorophenol/alpha-pinene, 60° C.) of 0.6. 1.36 g. was decomposed in aqueous HCl and the solution analyzed for oxyethylene-containing residues by gas chromatography. The results showed the product to have contained 2% ethylene oxide as 50% monomeric oxyethylenes, 25% dimeric oxyethylenes and 25% trimeric oxyethylenes.

*Example II*

A mixture of formaldehyde gas, ethylene oxide gas and $BF_3$ in a nitrogen stream was passed through the reactor as described in the general procedure for one hour at 25° C. Total throughput was 24 g. of formaldehyde, 22 g. of ethylene oxide, 0.15 g. $BF_3$. There resulted 5.4 g. of product having an I.V. of 0.3. The product retained 70% of its weight during hydrolysis. Decomposition of 3.4 grams of this residue in aqueous HCl followed by gas chromatography analysis showed an ethylene oxide content of 5% at a distribution of 40% mono-, 20% di-, and 40% trimeric oxyethylenes.

*Example III*

A mixture of formaldehyde, ethylene oxide and $BF_3$ gases was passed through the reactor described in the general procedure for one hour at 25° C. Total throughput was 28 g. of formaldehyde, 44 g. of ethylene oxide and 0.15 g. $BF_3$. There resulted 7.8 g. of product having an I.V. of 0.3. The product retained 68% of its weight during hydrolysis. Decomposition of 5.0 grams of this residue in aqueous HCl followed by gas chromatography analysis showed an ethylene oxide content of 9.6% at a distribution of 32% mono-, 26% di-, and 42% trimeric oxyethylenes.

A comparison of the ethylene oxide content of the copolymers of Examples I, II and III indicates that in the gas phase copolymerization of this invention, there is a tendency toward the formation of copolymers having ethylene oxide contents in the desired range despite large differences in the ethylene oxide content of the reactant mixture. This is in contrast to solution copolymerization of the same comonomers in which it is difficult to obtain a copolymer of the desired ethylene oxide content regardless of what the ethylene content of the reactant mixture may be.

A graphic illustration of the tendency of the process of this invention to produce copolymers of the desired comonomer proportions may be seen in the drawing wherein the ethylene oxide content of the reactant mixtures in Examples I, II and III (shown on the left) is correlated with the ethylene oxide content of the hydrolyzed copolymers produced. As may be seen, reactant mixtures containing as little as 13% of ethylene oxide or as much as 61% of ethylene oxide produced copolymers containing sufficient oxyethylene units to provide stability but not such an excessive amount as would detract from the physical properties of the product.

It is to be understood that the foregoing detailed description is given merely by way of illustration and that many variations may be made therein without departing from the spirit of our invention.

The embodiments of the invention in which an exclusive property or priviledge is claimed are defined as follows:

1. A method for producing a stable oxymethylene copolymer, which comprises:

(a) introducing into a reaction zone a gasiform mixture consisting essentially of formladehyde and from about 0.01 to about 10 mols, per mol of formaldehyde, of a comonomer, which contains adjacent carbon atoms and is capable of copolymerizing with the formaldehyde, and (b) reacting said gasiform mixture therein in the presence of a cationic formaldehyde polymerization catalyst to yield, in contact with the gasiform mixture, a stable oxymethylene copolymer having a molecular weight of at least 1000.

2. A method for producing a stable oxymethylene copolymer, which comprises:
(a) introducing into a reaction zone a gasiform mixture consisting essentially of formaldehyde and from about 0.01 to about 10 mols, per mol of formaldehyde, of a comonomer selected from the class consisting of
cyclic ethers having the structure $$\begin{matrix} CH_2\!-\!O \\ | \quad\quad | \\ CH_2\!-\!(OCH_2)_n \end{matrix}$$

wherein $n$ is an integer from zero to 2; trimethylene oxide; tetramethylene oxide; pentamethylene oxide; 1,2 propylene oxide; 1,2 butylene oxide; 1,3 butylene oxide; and 2,2 di (chloromethyl) 1,3 propylene oxide, and
(b) reacting said gasiform mixture therein in the presence of a cationic formaldehyde polymerization catalyst to yield, in contact with a gasiform mixture, a stable oxymethylene copolymer having a molecular weight of at least 1000 and said copolymer containing from about 0.1 to about 15 percent comonomer units, based on the total momomeric units.

3. The method of claim 2 wherein the cationic polymerization catalyst is selected from the class consisting of
(i) acidic metal halides,
(ii) boron trifluoride, and
(iii) volatile organic complexes of boron trifluoride.

4. The method of claim 3 wherein the comonomer is selected from the class consisting of
cyclic ethers having the structure $$\begin{matrix} CH_2\!-\!O \\ | \quad\quad | \\ CH_2\!-\!(OCH_2)_n \end{matrix}$$

wherein $n$ is an integer from zero to 2.

5. The method of claim 3 wherein the comonomer is ethylene oxide.

6. The method of claim 3 wherein the gasiform mixture is reacted in the presence of the cationic catalyst at a temperature in the range of from about $-19°$ to about $100°$ C.

7. A method for producing a stable oxymethylene copolymer, which comprises:
(a) introducing into a liquid-free reaction zone, a gasiform mixture consisting essentially of formaldehyde and from about 0.01 to about 10 mols, per mole of formaldehyde, of a comonomer selected from the class consisting of
cyclic ethers having the structure $$\begin{matrix} CH_2\!-\!O \\ | \quad\quad | \\ CH_2\!-\!(OCH_2)_n \end{matrix}$$

wherein $n$ is an integer from zero to 2, and
(b) reacting said gasiform mixture therein in the presence of a cationic catalyst selected from the class consisting of boron trifluoride and volatile organic complexes of boron trifluoride to yield, in contact with the gasiform mixture, a stable oxymethylene copolymer having a molecular weight of at least 1000 and said copolymer containing from about 0.1 to about 15 percent comonomer units, based on the total monomeric units.

8. The method of claim 7 wherein the resulting copolymer contains from about 0.1 to about 5 percent comonomer units, based on the total monomeric units.

9. The method of claim 7 wherein the catalyst is present in an amount in the range of from about 0.01 to about 2 weight percent, based on the weight of the gasiform mixture.

10. The method of claim 7 wherein the gasiform mixture consists essentially of formaldehyde and ethylene oxide, and said gasiform mixture is reacted in the liquid-free reaction zone in the presence of boron trifluoride.

11. The method of claim 10 wherein the gasiform mixture is reacted at a temperature in the range of from about 10° to about 60° C. in the presence of from about 0.01 to about 2 weight percent of catalyst, based on the weight of the gasiform mixture, to yield a copolymer containing from about 0.1 to about 5 percent comonomer units, based on the total monomeric units.

References Cited by the Examiner

UNITED STATES PATENTS

| | | | |
|---|---|---|---|
| 2,795,571 | 6/1957 | Schneider | 260—67 |
| 2,951,059 | 8/1960 | Axtell et al. | 260—67 |
| 2,989,511 | 6/1961 | Schnizer | 260—67 |
| 3,091,599 | 5/1963 | Jean | 260—67 |
| 3,093,617 | 6/1963 | Hugin et al. | 260—67 |
| 3,115,480 | 12/1963 | Steadman et al. | 260—67 |

OTHER REFERENCES

Kern et al.: Angewandte Chemie, 73 (6), pp. 177–186 (1961) (pp. 181–183 relied on).

WILLIAM H. SHORT, *Primary Examiner.*

L. M. PHYNES, *Assistant Examiner.*